RADIATION HARDENED RECORDING SYSTEM

INVENTORS
VINCENT J. KORKOWSKI
FRED G. HEWITT
RAYMOND H. JAMES
CHARLES W. LUNDBERG
BY Thomas J. Nikolai
ATTORNEY

United States Patent Office 3,432,819
Patented Mar. 11, 1969

3,432,819
RADIATION HARDENED RECORDING SYSTEM

Vincent J. Korkowski, Minneapolis, Fred G. Hewitt, St. Paul, Raymond H. James, Bloomington, and Charles W. Lundberg, St. Paul, Minn., assignors to Sperry Rand Corporation, New York, N.Y., a corporation of Delaware Filed Mar. 17, 1964, Ser. No. 352,524
U.S. Cl. 340—174 14 Claims
Int. Cl. G11b *5/00;* G01t *1/16;* H01j *39/00*

This invention relates to a means of recording a transient phenomenon by sampling at discrete intervals an electrical design representative of such phenomenon and in particular to such a device whose record is not susceptible to nuclear radiation deterioration.

In recent years a considerable amount of time and effort has been expended upon the investigation of the effects of nuclear-weapon-burst and simulated-burst radiation on electronic components and semi-conductor devices. Such work is principally concerned with the effects due to gamma ray and neutron bombardment of a transient radiation environment. Two reports—REIC Report No. 18, June 1, 1961 and REIC Report No. 26, Apr. 19, 1963, "Radiation Effects Information Center," Battelle Memorial Institute, Columbus 1, Ohio—cover this phase of the effects of nuclear radiation with a listing of probable component degradations. As pointed out in these above referenced reports, transient radiation effects on electronic components and semiconductor devices range from moderate to destructive with magnetic devices being the least susceptible to degradated performance.

Prolonged radiation such as in the immediate proximity of an active reactor affects magnetic properties much the same as prolonged heating. Those materials which owe their distinctive properties to special heat treatments are most rapidly and permanently affected by high energy radiation. Materials such as ferrites which have low Curie temperatures are impaired magnetically if their temperature rises excessively, either due to proximity to a heat source, or to internal conversion of radiant energy into heat. Otherwise, ferrites are notably immune to radiation damage, to either temporary or long time exposure.

With a magnetic device as an established radiation-hardened device (i.e., a device whose operating characteristics are substantially unaffected by intense gamma ray and neutron bombardment) the present invention provides a portable recorder that is light-weight, that requires no external power and that may be placed in a transient radiation environment along with the device to be tested. The recorder provides a highly reliable, recoverable record of the measured, or detected phenomenon (i.e., the effect upon the tested device) as a result of exposure to such an environment.

In the preferred embodiment of applicants' invention, a sensor detects, or monitors the effect upon the operating characteristics of the device being tested while both items, the device being tested and the recorder, are in the transient radiation environment. The recorder converts the monitored characteristics, which may be in the form of a transient electrical signal, into discrete data levels, each discrete data level indicative of the level of the signal sampled portion. These discrete data levels are stored in corresponding separate detectors which are preferably magnetic memory elements such as toroidal ferrite cores or transfluxors. Upon cessation of the intense radiation bombardment, the recorder may be removed from the test environment and taken to laboratory-type facilities where the information stored in the detectors is read out and presented in a directly useable form.

In comparison to the method of the detection of transient phenomenon in electronic components and semiconductor devices due to transient radiation effects as made possible by applicants' invention, present day methods are costly and cumbrous. Conventional methods involve the remote recording of such effects by magnetic tape devices and monitor oscilloscopes. However, consider a device to be tested which has, for example, fifty separate effects to be monitored. As each separate effect, or phenomenon, requires a separate recording device, i.e., a separate magnetic tape unit or oscilloscope, such a testing procedure could require the investment of hundreds of thousands of dollars to provide a useful analysis of the effects of the test. Further, frequency response of these recording devices—as the monitored characteristic is a non-cyclical transient electrical signal of microsecond duration—is insufficient to provide an accurate analysis of the initial reaction of the operating characteristics of the tested device to the transient radiation bombardment.

The uncertainty in the knowledge of actual nuclear weapon-burst bombardment radiation spectrum, real-time history and the relative effects of neutrons, gamma rays and neutron-induced gamma rays has made is difficult to calculate vulnerability numbers for simulated effects. Recent developments in effects measurements such as secondary photocurrent in transistors and neutron effects in capacitors have made it even more important to determine the response of components and circuits to an actual weapon radiation environment. Such a determination requires a low-cost recorder that is easily hand-carried and self-contained so that it could be placed in the radiation environment to monitor radiation effects at a plurality of locations from the radiation source. Real-time bunker-installed devices such as magnetic tape units and monitor oscilloscopes with cable connections to radiation sensors have been the only recording devices utilized up to the present time. However, as each item of data to be recorded requires a separate recording device, the use of such devices requires a near-prohibitive expense. Additionally, the electromagnetic fields accompanying actual weapon-burst bombardment radiation often causes complete destruction of the monitored signals through adverse effects upon the cabling coupling the monitored signal to the recording device. Consequently, a serious need has developed for a low-cost, portable, real-time recorder that is completely self contained and that requires no radiation shielding. The present invention provides a device whose recorded monitored data is substantially insensitive to a peak gamma-radiation pulse of $10^{10}$ ergs g. $^{-1}$ (C) sec. sec.$^{-1}$ $10^{10}$ ergs per gram per second reference to carbon), thermal shocks below the magnetic storage device's Curie temperature, overpressure, blast, electro-magnetic field and ground shock.

Additionally, the effects of high energy electrons on semiconductor devices are currently of great interest because of increasingly frequent exposure of satellite space craft with electronic equipment to the Van Allen radiation belts. The present invention provides a device that could be exposed to such radiation and which would provide a recoverable record of the characteristics of such radiation belts.

Accordingly, it is a primary object of the present invention to provide a portable radiation-hardened recorder of transient phenomena due to intense transient nuclear radiation bombardment.

Another object of the present inevntion is to provide a recorder whose recorded information is substantially unaffected by gamma ray and neutron bombardment of a transient radiation environment.

Another object of the present invention is to provide a portable radiation-hardened recorder of transient phenomena which utilizes passive delay lines to convert transient electrical input into sampled portions, the amplitudes of the sampled portions defining the waveform.

A further object of the present invention is to provide a portable radiation-hardened recorder which converts a microsecond duration, non-reocurring, electrical signal into discrete signal amplitudes representative of the electrical signal waveform and stores each such discrete signal in separate detecting means for subsequent readout.

This invention in its preferred embodiment utilizes memory elements of magnetizable material and in particular such elements that store discrete levels of data as a function of the degree of the partial switching of the elements' magnetic flux. Accordingly, a discussion of such elements and their modes of operation is given below.

The value of the utilization of small cores of magnetizable material as logical memory elements in electronic data processing systems is well known. This value is based upon the bistable characteristic of magnetizable cores which include the ability to retain or remember magnetic conditions which may be utilized to indicate a binary "1" or a binary "0." As the use of magnetizable cores in electronic data processing equipment increases, a primary means of improving the computational speed of these machines is to utilize memory elements which possess the property of nondestructive readout, for by retaining the initial state of remanent magnetization after readout the rewrite cycle required with destructive readout devices is eliminated. As used herein, the term "nondestructive readout" shall refer to the sensing of the state of the remanent magnetization of a magnetizable core without destroying such remanent magnetization. This should not be interpreted to mean that the state of the remanent magnetization of the core being sensed is not temporarily disturbed during such nondestructive readout.

Ordinarily magnetizable cores and circuits utilized in destructive readout devices are now so well known that they need no special description herein. However, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the switching threshold characteristic of a core having a substantially rectangular hysteresis characteristic. In this technique, a minimum of two interrogate lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Non-Destructive Sensing of Magnetic Cores," Transactions of the AIEE, Communications on Electronics, Buck and Frank, January 1954, pp. 822–830. This method utilizes a bistable magnetizable toroidal memory core having write and sense windings which thread the central aperture, with a transverse interrogate field, i.e., an externally applied field directed across the core's internal flux applied by a second low remanent magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article, "The Transfluxor," Rajchman and Lo, Proceedings of the IRE, March 1956, pp. 321–332. This method utilizes a "transfluxor" which comprises a core of magnetizable material of a substantially rectangular hysteresis characteristic having at least a first larger aperture and a second small aperture therethrough. These apertures form three flux paths; the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

A still further technique of achieving nondestructive readout of the magnetic memory core is that disclosed in the article, "Fluxlock-High Speed Core Memory," Instruments and Control Systems, Robert M. Tillman, May 1961, pp. 866–869. This method utilizes a bistable magnetic toroidal memory core having write and sense windings threading the core's central aperture and an interrogate winding wound about the core along a diameter of the core. Information is stored in the core in the conventional manner. Interrogation is achieved by coupling an interrogate current signal to the interrogate winding causing a temporary alteration of the core's magnetic state. Readout of the stored information is achieved by a bipolar output signal induced in the sense winding, the polarity phase of the readout signal indicating the information stored therein.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i e., the magnetomotive force is applied for a sufficient time duration to allow the core flux density to reach a stabilized condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on readout of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is less than the flux density of the second stable-state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article, "Flux Distribution in Ferrite Cores Under Various Modes of Partial Switching," R. H. James, W. M. Overn and C. W. Lundberg, Journal of Applied Physics, Supplement, vol. 32, No. 3, pp. 38S–39S, March 1961, provides excellent background material for the switching technique utilized in the present invention.

The magnetic conditions and their definitions as discussed above may now be itemized as follows:

PARTIAL SWITCHING

Amplitude-limited.—Condition wherein with a constant drive field amplitude, increase of the drive field duration will cause no appreciable increase in core flux density.

Time-limited.—Condition wherein with a constant drive field amplitude, increase of the drive field duration will cause appreciable increase in core flux density.

COMPLETE SWITCHING

Saturated.—Condition wherein increase of the drive field amplitude or duration will cause no appreciable increase in core flux density.

STABLE-STATE

Condition of the magnetic state of the core when the core is not subjected to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense.

The preferred embodiment of the present invention is concerned with the establishment of a predeterminably variable magnetic flux level in a magnetizable memory device which flux level is representative of the amplitude of an incremental portion of a transient electrical signal. In the preferred embodiment an incremental portion of a transient signal from a first constant current souce is gated into the magnetic device by a stroke pulse from a second constant current source. The maximum amplitude of the transient signal is limited to a level well below the switching threshold of the magnetic device such that the transient signal alone is incapable of effecting the flux level of the magnetic device. The strobe pulse is of an amplitude sufficient to switch the flux state of the magnetic device from a first saturated state to a second and opposite saturated state but is of such a limited duration so as to preclude such complete flux reversal. However, such duration is sufficient to set the flux level in an intermediate time-limited flux state. Different incremental portions of the transient signal may be gated into the magnetic device by delaying the transient signal different time increments with respect to the stroke pulse; each different time delayed increment of the transient signal is gated by the strobe pulse into a separate magnetic device so that each separate magnetic device stores a flux level representative of the net magnetomotive force effect of the strobe pulse and that portion of the transient signal gated by the strobe pulse. The terms "signal," "pulse," etc., when used herein shall be used interchangeably to refer to the current signal that produces the corresponding magnetic field and to the magnetic field produced by the corresponding current signal.

Accordingly, it is a primary object of the present invention to provide a system and a method for the sampling of a constant current source transient electrical signal.

It is a further object of the present invention to provide a system and a method for the flux gating of an incremental portion of a constant current source transient electrical signal by a constant current source time-limited strobe pulse.

It is a further object of the present invention to provide a system and a method whereby an electrical signal is sampled by a strobe pulse wherein the duration of the sampled portion of the electrical signal is determined by the duration of the strobe pulse.

It is a further and more general object of the present invention to provide a novel method of operating a magnetizable memory element as an electrical signal sampling device.

These and other more detailed and specific objects will be disclosed in the course of the following specification, reference being had to the accompanying drawings, in which.

Figure 1:
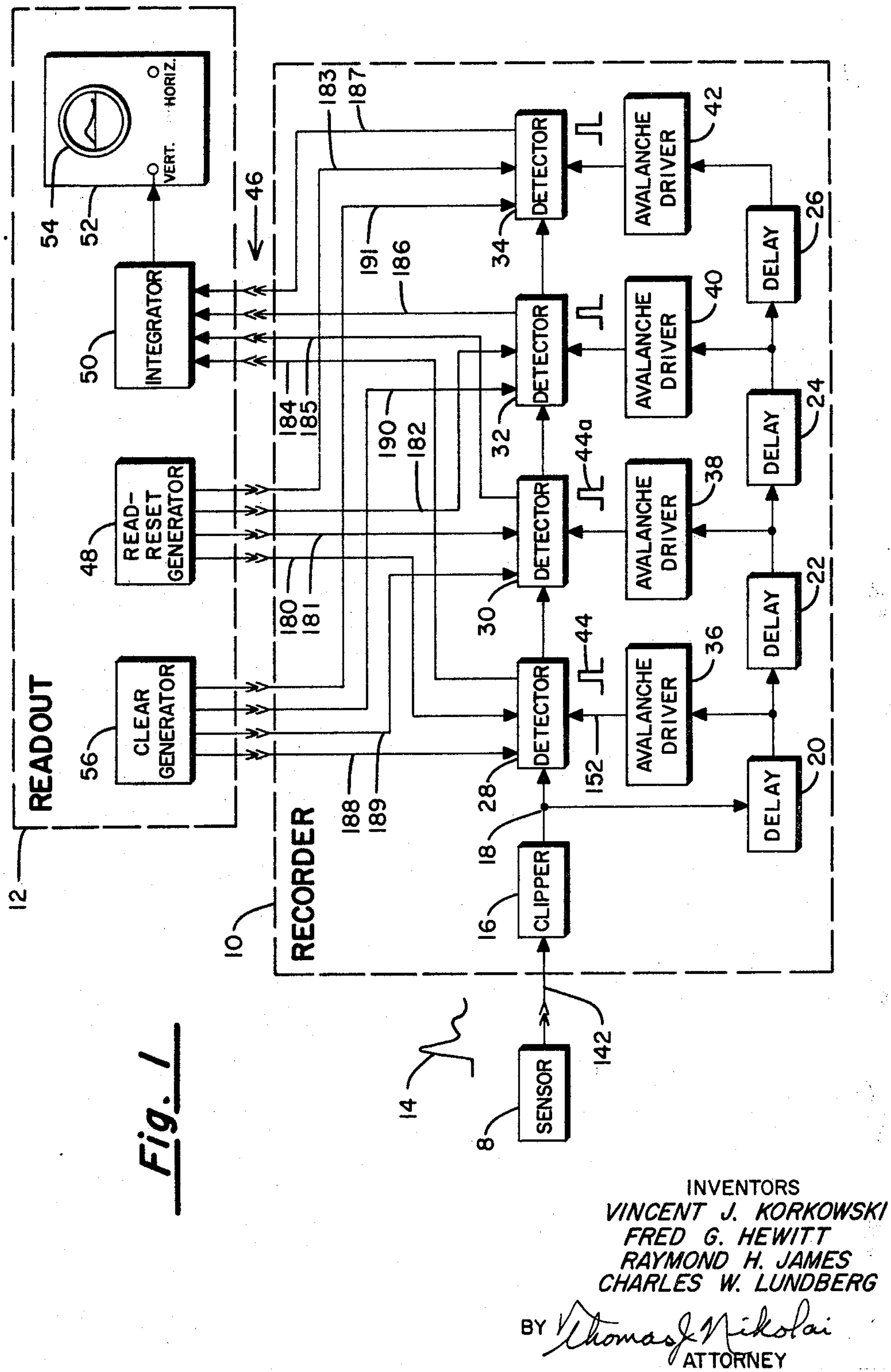
FIG. 1 is a block diagram of a preferred embodiment of a transient recorder and readout system incorporating the concepts of the present invention.

With particular reference to FIG. 1 there is disclosed a block diagram of a preferred embodiment of a low-cost, portable, real-time recorder that is completely self-contained requiring no external power supply or external control means. This preferred embodiment is substantially resistant over its operating range to an intense nuclear blast environment and, as there is no shielding provided therewith, its constituent components must operate satisfactorily under such conditions. The embodiment of FIG. 1 essentially consists of three elemental parts: the separate sensor 8 that generates a constant current source type transient electrical signal that defines the sensed phenomenon; the portable recorder 10 that converts the transient electrical signal into discrete data levels, each data level indicative of the signal amplitude of a sampled portion of said transient signal, and that stores each data level in corresponding separate detectors; and, the laboratory type readout system 12 that provides the necessary input control signals and output devices that permit readout and evaluation of the data stored in the detectors of recorder 10.

In the embodiment of FIG. 1, sensor 8 couples a transient signal, for example signal 14, to clipper 16 of recorder 10 which in turn couples its output signal to node 18 which is a point providing a common electrical input to the remainder of recorder 10. Clipper 16 is, in this embodiment, serially arranged between the sensor 8 and node 18 and is included to limit the maximum, or peak, level of signal 14 to that level that can be accommodated by the subsequently serially aligned detectors. Signal 14 at node 18 is coupled to the parallel arranged serial-string of delays 20, 22, 24 and 26 and serial-string of detectors 28, 30, 32 and 34. Each of the parallel arranged avalanche drivers 36, 38, 40 and 42 upon initiation by the delayed output of its associated delay 20, 22, 24 and 26, respectively, couples a strobe pulse 44 to an associated detector 28, 30, 32 and 34, respectively. The concurrence in time of the strobe pulse 44 and the transient signal 14 at the respective detector causes a portion of said transient signal to be sampled over the duration of the strobe pulse and causes such sampled portion to be stored in the associated detector. As will be discussed in more detail below, as transient signal 14 travels through the serially aligned detectors 28–34 without any substantial delay thereby and as transient signal 14 is delayed by progressively longer delay times as it travels down the serially aligned delays 20–22–24–26, the sampled portions of transient signal 14 that are stored in detectors 28–30–32–34 are sampled portions that are progressively greater, in time, from the wave front of transient signal 14. Consequently, the first detector to be encountered by signal 14 will sample a first portion of signal 14 waveform while the last detector to be encountered by signal 14 will sample a last portion of signal 14 waveform. It is apparent that any combination of delay times of delays 20–26 may be utilized to provide the desired sampling program. As an example if the wave front of signal 14 is to be sampled, delay 20 would be deleted providing no delay between the coupling of signal 14 from clipper 16 to detector 28 and the coupling of strobe pulse 44 from driver 36 to detector 28. Alternatively, if a last half of signal 14 waveform only is to be sampled over a plurality of different delay times, delay 20 would provide a relatively long delay time of substantially one-half the time duration of signal 14 with delays 22, 24, and 26, each providing relatively short delay times spaced so as to sample the desired portions of the last half of signal 14.

Delays 20–26 may each delay signal 14 an approximately equal delay time, such as 2D. Accordingly, if the recorder 10 is to record the wave front of signal 14 delay 20 would provide a zero delay time—effectively deleted—with delays 22–26 each providing a like delay time 2D. Delay 20 couples the nondelayed signal 14 to both driver 36 and delay 22 causing driver 36 to generate strobe pulse 44, which for this example may be of a duration D, which it in turn couples to detector 28 concurrent with the coupling of signal 14 thereto from clipper 16. Accordingly detector 28 samples the wave front of signal 14 over the duration D of strobe pulse 44. Delay 22 delays signal 14 from delay 20 a delay time 2D coupling the 2D delay signal 14 to both driver 38 and delay 24 causing driver 38 to generate strobe pulse 44*a* which it couples to detector 30 concurrent with the coupling of signal 14 thereto from detector 28. Accordingly, detector 30 samples the waveform of signal 14 at a delay time 2D over the duration of strobe pulse 44*a*. In a like manner delays 24 and 26 each progressively delay signal 14 a delay time 2D causing portions of signal 14 at delay times 4D and 6D, respectively, to be sampled at and stored in detectors 32 and 34, respectively.

Once the information is stored in recorder 10, readout system 12 may be utilized to readout and evaluate such information. With readout system 12 coupled to recorder 10 at connector 46 read-reset generator 48 couples the proper read signal individually and selectively to detectors 28–34. Output signals indicative of the information stored in detectors 28–34 are, upon the separate coupling of the read signal thereto, coupled to integrator 50 which integrates the output signals from detectors 28–34 providing a representative signal which is coupled to the vertical input terminal of oscilloscope 52. The signal trace on oscilloscope face 54 is then capable of evaluation as to the signal amplitude defining the level of the information stored in the respective detector. Alternatively, the output of integrator 50 could be coupled to a signal analyzer that could provide a direct reading of the level of the information stored in the respective detector. After evaluation of the stored information, clear generator 56 couples a clear signal to detectors 28–34 clearing the information stored therein and preparing them for a subsequent recording operation.

Figure 2:
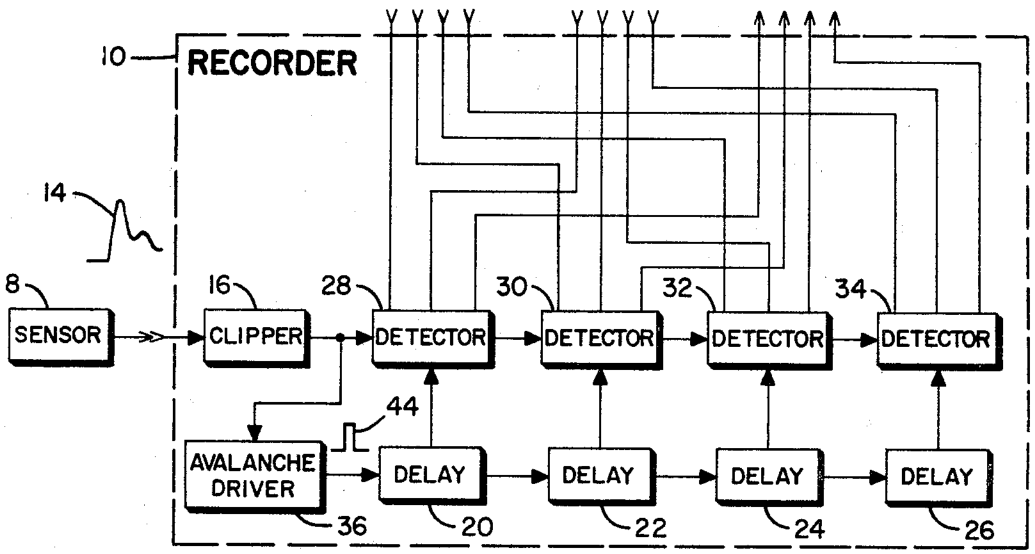
FIG. 2 is a block diagram of a second preferred embodiment of the recorder of FIG. 1.

With particular reference to FIG. 2 there is disclosed a block diagram of a second preferred embodiment of the present invention. This is a modification of the recorder 10 of FIG. 1 wherein the output of clipper 16 is coupled to the parallel-arranged serial-string of detectors 28–34 and serial-string of driver 36 and delays 20–26. Operation of the system of FIG. 2 is similar to that of FIG. 1 with the only essential difference being that in the system of FIG. 2 signal 14 is initially converted by driver 36 to a strobe pulse 44 with each succeeding delay 20–22–24–26 delay successively delaying strobe pulse 44 the appropriate additional delay time. Signal 14 and the successively delayed strobe pulses 44 are concurrently coupled to the associated detectors causing the successive concurrently sample portions of signal 14 to be stored in the associated detectors.

Figure 3:
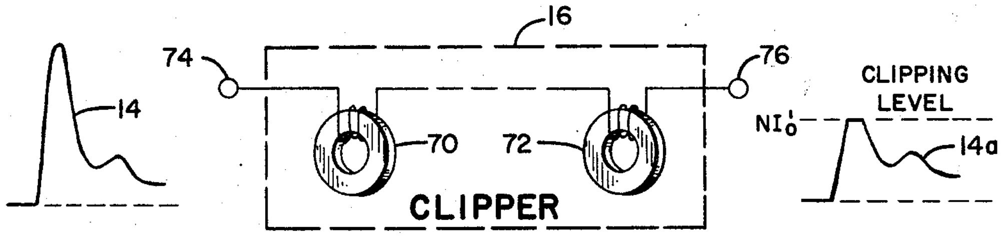
FIG. 3 is an illustration of a magnetic clipper that may be used with the recorder of FIG. 1.

With particular reference to FIG. 3 there is disclosed an illustration of a magnetic clipper which may be utilized as clipper 16 of FIG. 1. In this embodiment it is the purpose of clipper 16 to clip off, or remove, that portion of the input signal 14 whose amplitude is larger than the storage capacity of the associated detector. Cores 70 and 72 may be typical bistable ferrite cores whose switching threshold is equal to $NI_0'$. Prior to any recording, cores 70 and 72 are set into the negative saturated remanent magnetic state by a clear pulse such as that from clear generator 52 which is of a negative saturating current pulse sense. A positive current pulse, such as signal 14, having no portion thereof greater than $NI_0'$ when coupled to input terminal 74 would pass unaffected—except for a possible increase in rise time—through clipper 16 and would be emitted at terminal 76. However, any portion of signal 14 greater than $NI_0'$ would cause the magnetic flux of cores 70 and 72 to be switched toward the positive saturated remanent magnetic state. Concurrent with this flux reversed, a back EMF will be induced in the turns about the cores which EMF is in opposition to the incoming signal 14. The resultant output at terminal 76 will effectively consist of signal 14*a* which ideally is that portion of the incoming signal 14 whose amplitude does not exceed the MMF of $NI_0'$. The clipping level $NI_0'$ for a given core is dependent upon the number of turns about the core; the amount of clipping of the incoming signal 14 is determined by $N\phi$, where $\phi$ is the volt-time integral of the core per turn and N is the number of turns about the core.

Figure 4:
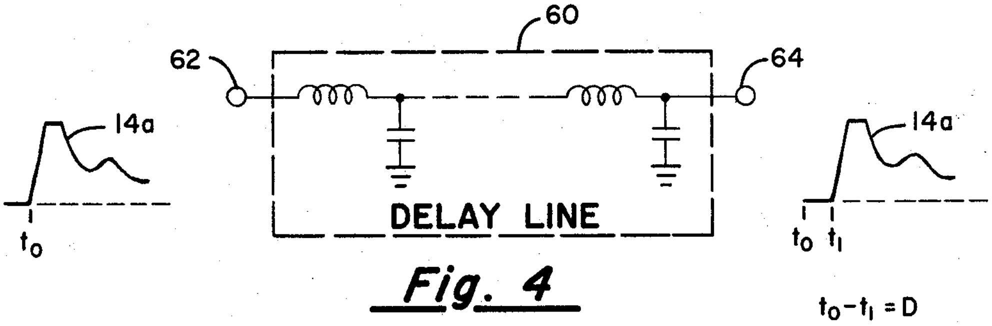
FIG. 4 is an illustration of a delay line that may be used with the recorder of FIG. 1.

With particular reference to FIG. 4, there is disclosed an illustration of a lumped constant delay line that may be utilized as the delays 20–26 of FIG. 1. In this embodiment delay line 60 having input terminal 62 and output terminal 64 is made up of a cascaded series of LC sections the parameters of which are adjusted to delay signal 14*a* at input terminal 62 the delays of 2D, 4D, 6D–*n*D at output terminal 64. Although a lumped constant delay line is illustrated any appropriate form of delay line may be utilized. See the text "Pulse and Digital Circuits" McGraw-Hill, pp. 286–321 for an excellent discussion of delay line theory.

Figure 5:
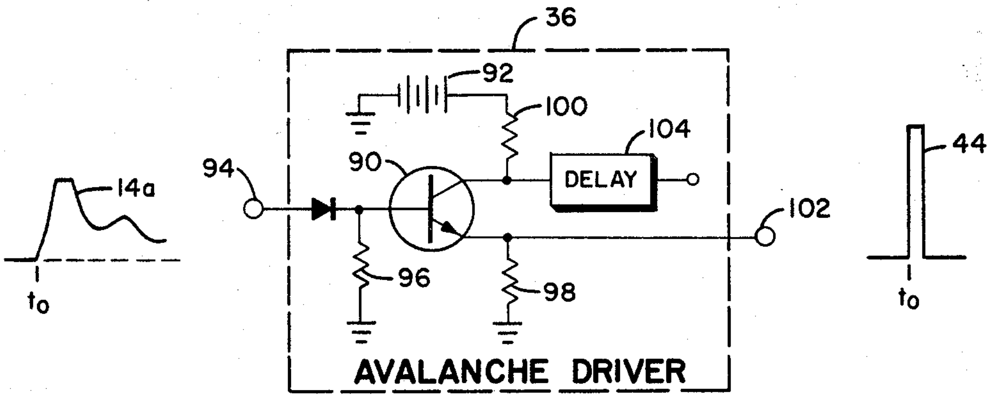
FIG. 5 is an illustration of an avalanche driver transistor amplifier that may be used with the recorder of FIG. 1.

With particular reference to FIG. 5, there is disclosed an illustration of an avalanche driver that may be utilized as drivers 36–42 of FIG. 1. In this embodiment it is the purpose of driver 36 to generate strobe pulse 44 upon activation by signal 14. A recorder 10 is primarily for the purpose of recording sampled portions of a transient signal while in an environment of intense nuclear radiation, recorder 10 is considered to be a one-shot recording device. That is, the recorder is to be exposed to a single transient signal, to record sampled portions thereof and then to have the stored data readout in laboratory type facilities by readout system 12 prior to exposure to a subsequent transient signal. As the radiation environment may have a permanent degrading effect upon the operating characteristics of avalanche transistor 90 and battery 92, such components are considered to be expendable items and may, if necessary, be replaceable parts to be replaced after each exposure to the radiation environment.

With no signal coupled to terminal 94 of driver 36, transistor 90 is reverse biased into the normal nonconducting mode by the biasing arrangement of resistors 96, 98 and 100 and the positive voltage source of battery 92 providing a zero voltage signal at output terminal 102. The capacitors of open ended delay line 104 (see FIG. 4) are then charged to a potential of approximately 130 volts by battery 92 through resistor 100. When signal 14 is coupled to terminal 94 the collector-base electrode junction of transistor 90 is reverse biased beyond its avalanche breakdown potential and the collector-emitter electrode junction breaks down causing it to appear as a short circuit to the charge stored in the capacitors of delay line 104—resistor 100 is of a large value, such as 100,000 ohms, such that battery 92 is effectively isolated from transistor 90 during this breakdown period. Additionally, the circuit of FIG. 5 is itself capable of avalanche breakdown upon exposure to a radiation burst of the proper characteristic. If such a radiation burst is expected and the recorder of FIG. 2 is utilized signal 14 need not be coupled to avalanche driver 36 but the delays 20–26 would then be coupled between avalanche driver 36 and the respective detectors 28–34 delaying the stobe pulse rather than transient signal 14. Delay line 104 then discharges through the collector-emitter electrode junction of transistor 90 to ground through resistor 98 causing a high amplitude strobe signal 44 to appear at terminal 102. The delay line 104 continues to discharge through resistor 98 over a period twice the delay of delay line 104. Consequently, with a desired strobe pulse duration of, for example, 50 ns. (nanoseconds), the delay of delay line 104 is 25 ns. After this time delay line 104 is ineffective to hold the collector-emitter electrode junction of transistor 90 in its avalanche mode and transistor 90 reverts to its nonconducting mode again causing a zero potential signal to appear at terminal 102.

Figures 6, 7, 8:
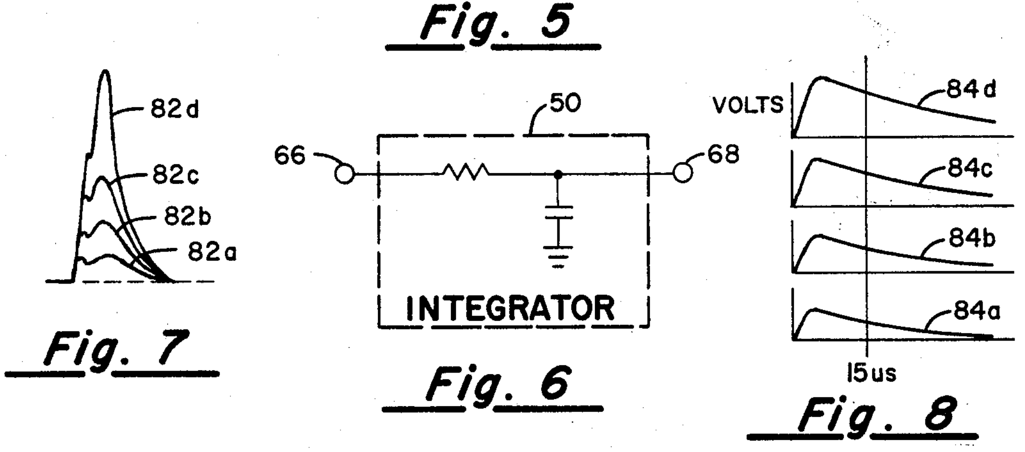
FIG. 6 is an illustration of an integrator that may be used with the readout system of FIG. 1.
FIG. 7 illustrates a set of typical readout signal waveforms from the detectors of the recorder of FIG. 1.
FIG. 8 is a diagram of a set of typical displays upon the face of the oscilloscope of FIG. 1 for the corresponding waveforms of FIG. 7.

With particular reference to FIG. 6 there is disclosed an illustration of an integrator that may be utilized as integrator 50 of FIG. 1. In this embodiment it is the purpose of integrator 50 to integrate the output signals of detectors 28–34 coupled to input terminal 66 and to provide at output terminal 68 a signal whose waveform can provide a reliable means of calibrating such detector output signals to provide a satisfactory correlation of the level of the data stored in the respective detector with a measured output signal amplitude. In one method of achieving such correlation, detector output signals 82*a*, 82*b*, 82*c* and 82*d* of FIG. 7, each representative of a different level of data stored in detectors 28, 30, 32, 34, respectively, when integrated by integrator 50 produced the integrator output signals 84*a*, 84*b*, 84*c* and 84*d*, respectively, of FIG. 8. Upon the observation and calibration of signals 84*a*, 84*b*, 84*c* and 84*d* as displayed upon oscilloscope face 54 it was determined that the amplitudes of such signals fter a certain delay time, for example at a time 15 μs. (microseconds) after their wavefronts, were in direct correlation with the levels of the data stored in the respective detectors.

To better understand a novel aspect of the present invention, a discussion of a constant current source driving signal as opposed to the use of a constant voltage source driving signal is presented.

Figure 9:
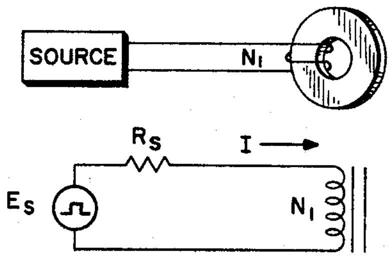
FIG. 9 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 9 illustrates the general circuit of a source driving a toroidal ferrite core with its equivalent circuit:

$E_s$=source voltage
$R_s$=source internal resistance
$N_1$=number of turns in the coil about the core
I=current flowing through the coil about the core This circuit may be defined mathematically by Equation 1

$$E_s=IR_s-N\frac{d\phi}{dt} \quad (1)$$

with it being assumed that the core is always initially in its negative saturated state and that the drive signal from the source drives the magnetic state of the core toward its positive saturated state. By making $R_s$ sufficiently small enough, Equation 1 reduces to Equation 2.

$$E_s \cong -N\frac{d\phi}{dt} \qquad (2)$$

Therefore, by making $R_s$ sufficiently small the conditions of a constant voltage source are fulfilled. Since $E_s$ and N are constants, $d\phi/dt$ is also a constant, and consequently the flux reversal is a linear function of time.

$$\int_{-\phi_s}^{\pm\phi_1} d\phi = \frac{E_s}{N_1}\int_0^t dt \phi_s - \phi_1 = \frac{E_s t}{N_1} \qquad (3)$$

For a complete flux reversal the integral, taken from $-\phi_s$ to $+\phi_s$, is (with $T_s$=time required for a complete flux reversal from $-\phi_s$ to $+\phi_s$)

$$\int_{-\phi_s}^{+\phi_s} d\phi \frac{E_s}{N_1}\int_0^{T_s} dt 2\phi_s = \frac{E_s T_s}{N_1} \qquad (4)$$

The voltage E induced in any coil about the core is (with $N_2$=the number of turns of a second coil on the core)

$$E = \frac{E_s N_2}{N_1} = \frac{2\phi_s}{T_s}$$

Figure 11:
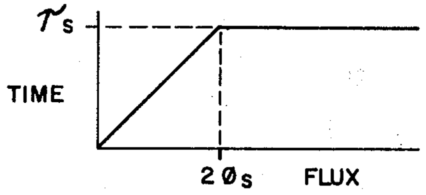
FIG. 11 is an illustration of the plot of flux versus time of the core of FIG. 9.
Figure 10:
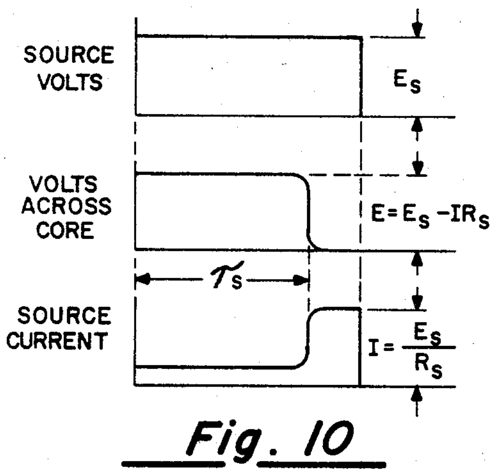
FIG. 10 is an illustration of the resulting voltages and currents of the circuit of FIG. 9 when driven by a constant voltage source.

The resulting voltages and currents under constant voltage source conditions are illustrated in FIG. 10, Equations 3 and 4 show that a plot of flux $\phi$ versus time would be as illustrated in FIG. 11. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot of flux $\phi$ versus time over the range of $0<\phi<2\phi_s$ as illustrated in FIG. 11 is due to the characteristics of the constant voltage source rather than those of the core.

If $R_s$ is made sufficiently large, Equation 1 reduces to Equation 5.

$$E_s \cong IR_s \qquad (5)$$

Figure 12:
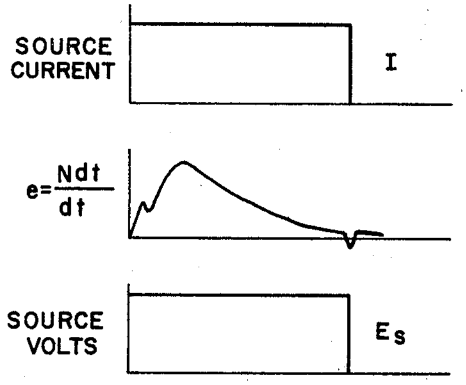
FIG. 12 is an illustration of the resulting voltages and currents of the circuit of FIG. 9 when driven by a constant current source.

Therefore, by making $R_s$ large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 12. It is under these constant current source conditions that this present invention is concerned.

Figure 13:
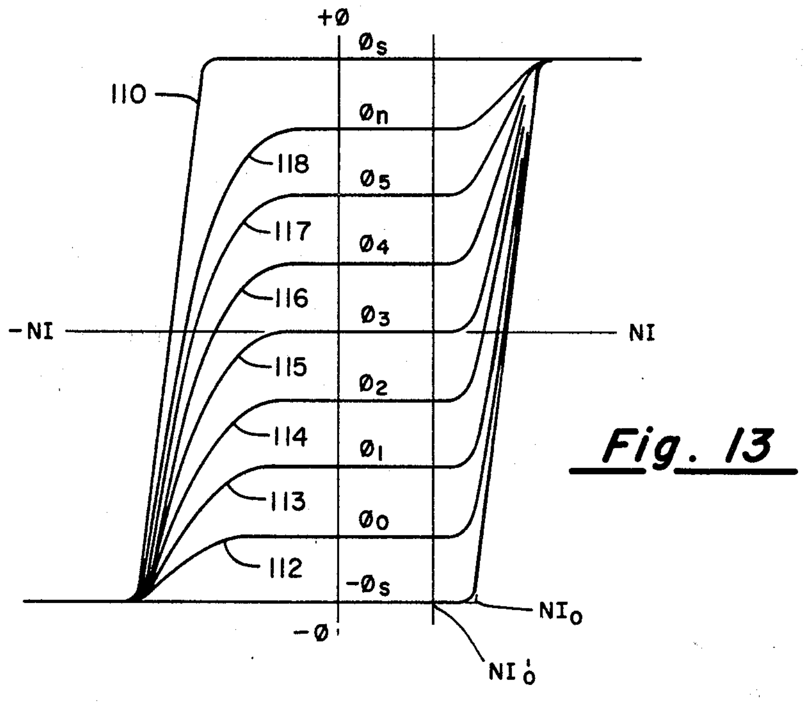
FIG. 13 is an illustration of the residual magnetization of the core of FIG. 9 utilizing the time-limited different-amplitude flux sampling strobe pulses of the present invention.

A phenomenological understanding of a time-limited flux state in a toroidal core, or the flux path about an aperture in a plate of magnetizable material such as a transfluxor, can be obtained by considering the flux distribution therethrough. The switching time $\tau_s$, or the time required for complete flux reversal from a first flux saturated state to a second and opposite flux state is given as follows:

$$\tau_s = \frac{S_w}{H - H_0} = \frac{S_w'}{NI - NI_0}$$

where $r$=radius of toroidal core
$\tau_s$=switching time
I=current in amperes
$S_w$=material constant
N=number of turns
H=applied field in oe (oersteds) $=NI/5r$
$H_0$=switching threshold in oe$=NI_0/5r$
$Sw'=Sw5r$ Since the applied field H is inversely proportional to the radius of the core, flux reversal takes place faster in an inside ring of the core than in an outside ring of the core. Applying a time-limited drive field to the core results in a flux reversal distribution which decreases with increase in radial distance. That portion of the core which is in a partial switched state exhibits magnetic properties which are similar to a demagnetized state except for the asymmetry as illustrated in FIG. 13. The amount of asymmetry and the shape of the curve for a time-limited state are functions of both the drive field amplitude and duration.

With particular reference to FIG. 13 there is illustrated a residual magnetization curve 110 of the magnetic devices utilized by the present invention. Curve 110 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic state, such as $-\phi_s$, into a second and opposite saturated remanent magnetic state, such as $+\phi_s$.

Curves 112–118 are the residual magnetization amplitude-limited curves from the respective time-limited stable-states $\phi_0-\phi_n$. As stated before, this time-limited partially-switched stable-state is obtained by terminating the saturating drive field current pulse before the flux reversal, as an example movement of the flux state from $-\phi_s$ to $+\phi_s$, has been completed. Then by applying drive field current pulses of different amplitudes and of a duration greater than the longest $\tau_s$ a family of curves 112–118 is obtained.

In the particular application of applicant's illustrated embodiment there is utilized a strobe pulse 44 (see FIG. 14) which is of a sufficient amplitude but of insufficient duration to switch the magnetic state of the coupled core from $-\phi_s$ to $+\phi_s$. This strobe pulse 44 is obtained from a constant current source and is limited in duration, e.g., time-limited, so as to set the magnetic state of the core in the flux state $\phi_0$ of curve 112. Any increase in the amplitude of pulse 44 causes the magnetic state of the coupled core to be set into a different greater flux state such as $\phi_1-\phi_n$ associated with curves 113–118, respectively.

Figure 15:
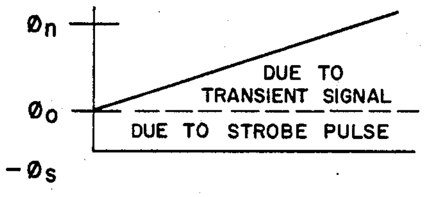
FIG. 15 is an illustration of the linearity of the plot of applied drive field and induced flux in a magnetizable memory element when operating from a constant current source as disclosed by the present invention.

With particular reference to FIG. 15 there is illustrated the linear relationship, over the range $\phi_0-\phi_n$, of the stable-state flux level and the strobe pulse amplitude. In applicant's present invention this variation of the strobe pulse amplitude is achieved by the concurrent action of a constant amplitude strobe pulse and a variable amplitude transient signal. The change in flux level is adjusted to be a linear function of that portion of the transient signal that is concurrent in time with and gated by the strobe pulse.

Figure 14:
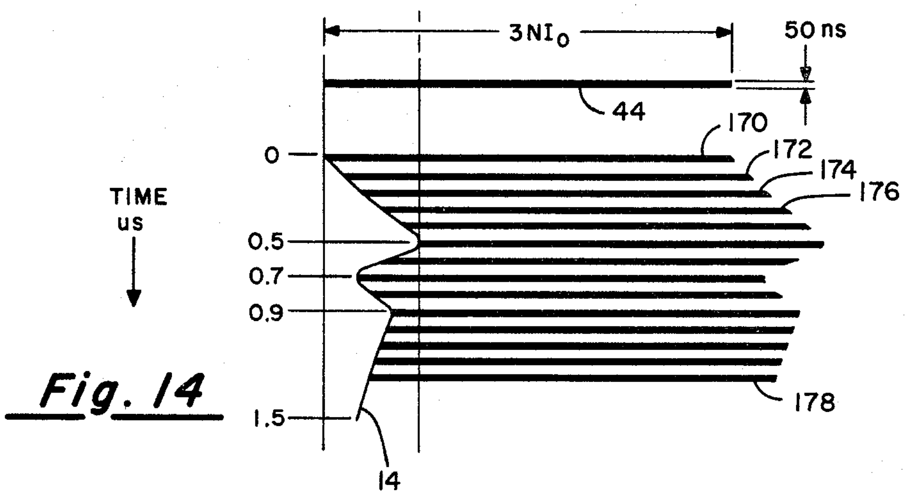
FIG. 14 is an illustration of a plot of a series of varying delayed strobe pulses upon a transient signal.

The present invention is concerned with a system utilizing a detector for and a method of sampling a transient current signal using the partial switching of a magnetic device. With particular reference to FIG. 14 there is illustrated a typical transient signal 130 which is to be sampled at any one or a plurality of times. Signal 130 is assumed to originate in a constant current soruce and is, in this embodiment, limited to a unidirectional signal whose maximum NI as regards the coupled magnetic device is less than $NI_0'$, the switching threshold. Of course, no such limitation is intended herein for a bidirectional signal of less than $NI_0'/2$ operating about a bias of $NI_0'/2$ could be utilized.

With particular reference to FIG. 1, there is illustrated a block diagram of a recorder system whereby such sampling may be accomplished. Assume that the sensor 8 detects a transient phenomenon such as a nuclear weapon burst whose radiation intensity versus time characteristic is defined by signal 14. Signal 14 is coupled to line 142 which after passing unaffected through clipper 16 is in turn coupled to the parallal arranged serial-string of delays 20, 22, 24 and 26 and serial-string of detectors 28, 30, 32 and 34 at node 18. Delays 20, 22, 24 and 26 may each delay signal 14 an appropriate time such as 0, 2D, 4D, and 6D, respectively, and accordingly delay 20 after a delay 0, would couple signal 14 to both delay 22 and driver 36. Driver 36 would emit strobe pulse 44 which is coupled by way of conductor 152 to detector 28. Strobe pulse 44 acts as a constant current source flux gate gating into detector 28 that portion of signal 14 which is concurrent with pulse 44. Accordingly, detector 28 would sample the wave front of signal 130 over the duration of strobe pulse 44 while detectors 30, 32 and 34 would sample signal 14 beginning at delays of 2D, 4D and 6D, respectively, over the duration of strobe pulse 44. As the present invention utilizes strobe 44 as a flux gate to the sampled portion of signal 14 the information stored in detectors 28, 30, 32 and 34 would be the net effect of the magnetomotive force of strobe pulse 44 and that magnetomotive force of that concurrent portion of signal 14 from the various delays 20, 22, 24 and 26. As an example: in detector 28, signal 14 is gated by the non-delayed strobe signal 44 of 0 to sample the leading edge of signal 14 as at pulse 170 of FIG. 14; in detector 30, signal 14 is gated by the delayed strobe signal 44 of 2D to sample signal 14 at a delay of 2D as at pulse 172; in detector 32, signal 14 is gated by the delayed strobe signal 44 of 4D to sample signal 14 at a delay of 4D as at pulse 174; while in detector 34, signal 14 is gated by the delayed strobe signal 44 of 6D to sample signal 14 at a delay of 6D as at pulse 176.

As a further example, assume that the system of FIG. 1 contains a parallel arranged serial-string of 14 delays such as that formed by delays 20–26 and a serial-string of 14 detectors such as that formed by detectors 28–34, that strobe pulse 44 is 50 ns. (nanoseconds) or 1D in duration and that each successive delayed signal 14 is delayed an additional increment 2D of 100 ns., i.e., the longest delay is $2D(n-1)$ or 26D or 1.30 μs. (microseconds) with the delay of delay 20=0. Avalanche driver 36 would emit a strobe pulse 44 concurrent with the coupling of signal 14 thereto causing the wave front of signal 14 to be sampled by the delay 20-driver 36-detector 28 set as at pulse 170. The delay-driver-detector sets having the progressively greater delay of strobe pulse 44 would have progressively delayed samples of signal 14 as at pulses 172, 174, 176, etc., until the delay-driver-detector set having the greatest delay of strobe pulse 44 would have the greatest delayed sample of signal 14 as at pulse 178. At this time the fourteen detectors would each have stored therein discrete levels of flux, each level indicative of the amplitude of the sampled portion of signal 14. Subsequent to the sampling procedure outlined above, the information stored in each detector could be read out by coupling a read, or interrogate, signal thereto as at readout lines 180, 181, 182 and 183 causing an output signal representative of the flux level stored in each detector to be coupled to the output lines 184, 185, 186 and 187 of detectors 28, 30, 32 and 34, respectively. After evaluation of the readout information and in preparation for a subsequent recording operation a clear signal from clear generator 54 could be coupled to clear lines 188, 189, 190 and 191 clearing detectors 28, 30, 32 and 34, respectively.

Figure 16:
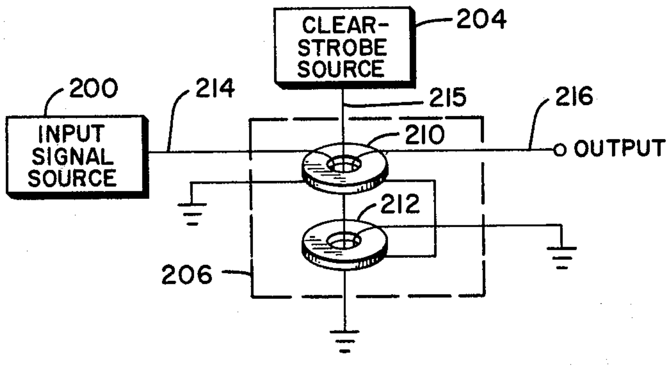
FIG. 16 is an illustration of a first embodiment of the present invention using toroidal ferrite cores as the detector elements.
Figure 17:
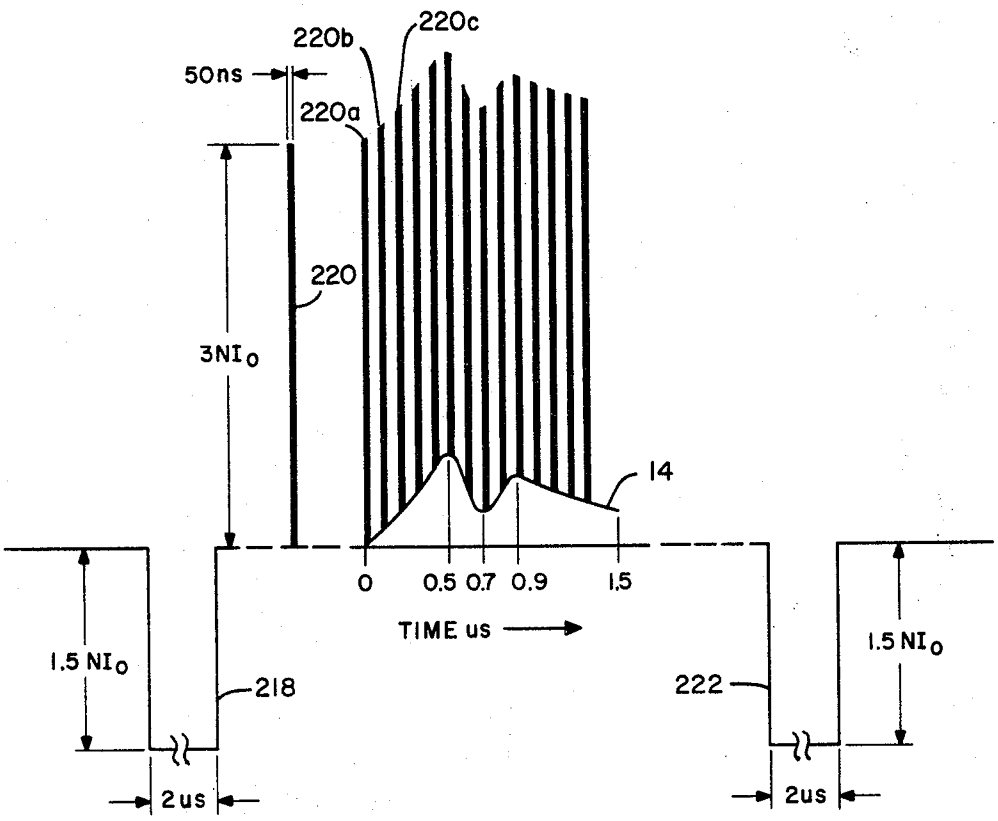
FIG. 17 is an illustration of the control signals associated with the embodiment of FIG. 16.

With particular reference to FIGS. 16 and 17 there is disclosed an embodiment of the present invention wherein the detectors are toroidal ferrite cores providing destructive readout of the information stored therein. Input signal source 200 could be any constant current transient signal source but here is analogous to sensor 8 while clear-strobe source 204 is analogous to a combination of avalanche driver 36 and clear generator 54 and detector 206 is analogous to detector 28 of FIG. 1. Detector 206 includes two cores: information core 210 and buck-out core 212. The signal defining the information to be stored in detector 206 is coupled only to core 210 in a first magnetic sense from source 200 by way of conductor 214 while the clear-strobe signal from source 204 is coupled to cores 210 and 212 in the same first magnetic sense by way of conductor 215 and the output conductor 216 is coupled to cores 210 and 212 in the first and a second and opposite magnetic sense, respectively.

The use of buck-out core 212 simplifies the readout process and allows a greater variation in strobe pulse characteristics as follows. Preparatory to the sampling operation, cores 210 and 212 are initially set into a clear state such as $-\phi_s$ of FIG. 13 by the coupling of clear pulse 218 (see FIG. 17) to conductor 215. Next, for the sampling operation, signal 14 is coupled to conductor 214 concurrently with the relatively delayed coupling of strobe pulse 220 to conductor 215. As the information signal 14 is coupled only to core 210 and as the strobe pulse 220 is coupled to both cores 210 and 212, each core is affected by a different magnetomotive force. Core 212, which is affected only by strobe pulse 220 is, for example, placed in the $\phi_0$ (see FIG. 13) state while core 210 which is affected by both signal 14 and strobe pulse 220 is placed in a state of greater flux reversal such as for example $\phi_1$. Upon readout, clear-strobe source 204 couples to conductor 204 read pulse 222, which is of the same magnetic sense as regards cores 210 and 212 and of the same amplitude-duration characteristic as is the clear pulse 218, causing both cores 210 and 212 to be placed back into their original $-\phi_s$ state. This change of the flux states of cores 210 and 212 from $\phi_1$ and $\phi_0$, respectively, back to their original flux state $-\phi_s$ produces a net flux change $\phi_1-\phi_0$ due to the oppositely wound sense of conductor 216 about cores 210 and 212. This difference flux then is the effective-output-signal producing-flux-change and accordingly produces an output signal which is substantially independent of the strobe signal 220 characteristics, and which is indicative of the amplitude of the sampled portion of signal 14.

As with the above described operation of the system of FIG. 1 the signal from source 200 would be signal 14 while the strobe pulse 220 could be delayed various delay times including one whose delay would be at least as long as the significant length of signal 14. As illustrated in FIG. 1 with the use of fourteen detectors, such as detector 206, and fourteen input sources, such as input source 200, each input source concurrently coupling signal 14 to its associated detector and with each sccessive clear-strobe source 204 providing a strobe pulse 220 having a delay of an additional $2D=100$ ns. (with the first delay=0) the successive magnetomotive forces of pulses **220*a*, 220*b*, 220*c*, etc., would be coupled to the detectors 206, etc., at successively increasing delay times with respect to the wave front of signal 14**.

Figure 18:
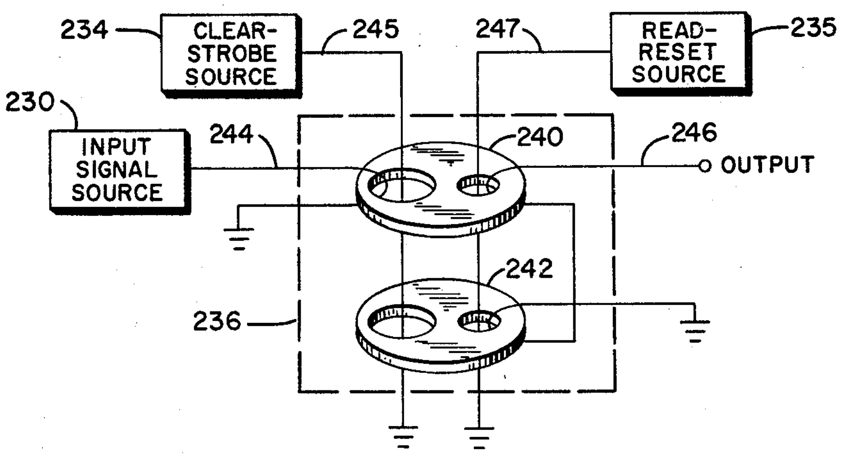
FIG. 18 is an illustration of a second embodiment of the present invention using transfluxors as the detector elements.
Figure 19:
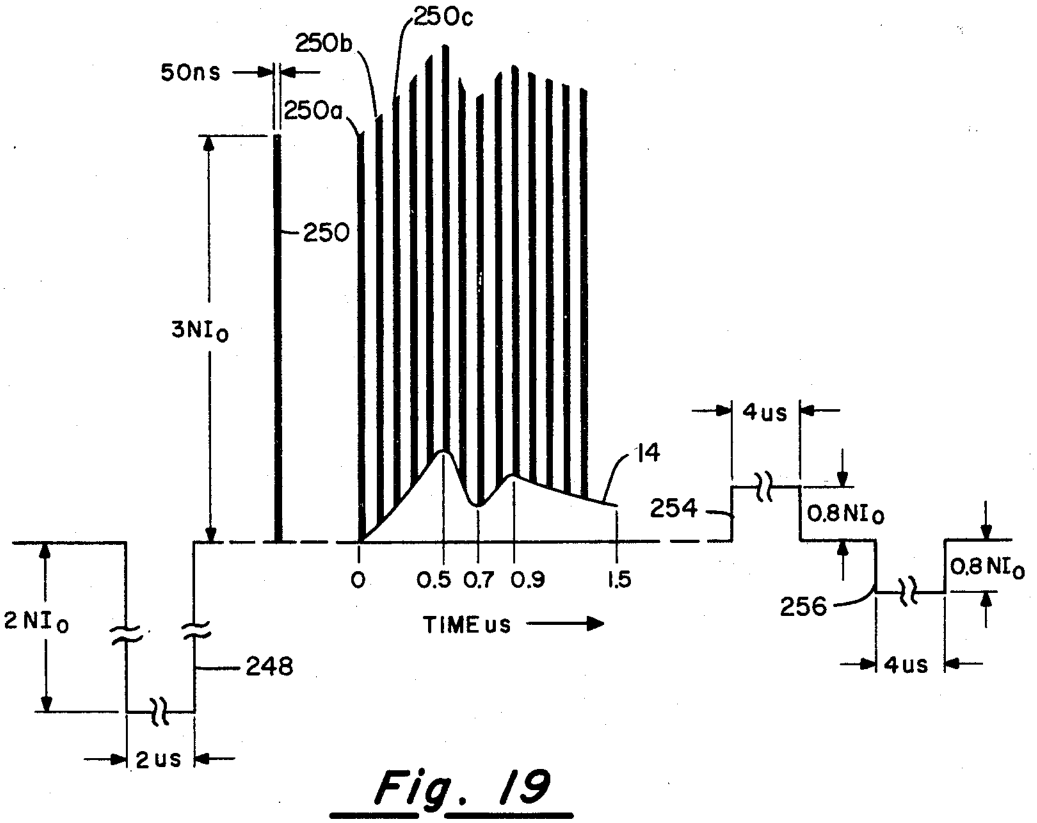
FIG. 19 is an illustration of the control signals associated with the embodiment of FIG. 18.

With particular reference to FIGS. 18 and 19 there is disclosed another embodiment of the present invention wherein the detectors are two-aperture transfluxors providing nondestructive readout of the information stored therein. Input signal source 230 could be any constant current transient signal source but here is analogous to sensor 8 while clear-strobe source 234 is analogous to a combination of avalanche driver 36 and clear generator 54 and detector 236 is analogous to detector 28 of FIG. 1. Read-reset source 235 is analogous to the read-reset generator 48 of FIG. 1 and is required in the transfluxor detector to provide the read-reset signal that is coupled to the small apertures thereof. Detector 236 includes two transfluxors; information transfluxor 240, and buck-out transfluxor 242. The signal defining the information to be stored in detector 236 is coupled only to the large aperture of transfluxor 240 in a first magnetic sense from source 230 by way of conductor 244 while the clear-strobe signal from source 234 is coupled to transfluxors 240 and 242 in the same first magnetic sense by way of conductor 245, the output conductor 246 is coupled to the small apertures of transfluxors 240 and 242 in the first and a second and opposite magnetic sense, respectively, and the read-reset signal is coupled to the small apertures of transfluxors 240 and 242 in the same first magnetic sense by way of conductor 247.

As with the arrangement of FIG. 16 the use of buck-out transfluxor 242 simplifies the readout process and allows a greater variation in strobe pulse characteristics as follows. Preparatory to the sampling operation the core defining periphery of the large apertures of transfluxors 240 and 242 are initially set into a clear state such as $-\phi_S$ of FIG. 13 by the coupling of clear pulse 248 to conductor 245. Next, for the sampling operation signal 14 is coupled to conductor 244 concurrently with the relatively delayed coupling of strobe pulse 250 to conductor 245. As the information signal is coupled only to the large aperture of transfluxor 240 and as the strobe pulse 250 is coupled to the large apertures of both transfluxors 240 and 242 each transfluxor is effected by a different magnetomotive force, the large aperture of transfluxor 242 which is affected only by strobe pulse 250 is, for example, placed in the $\phi_0$ state while the large aperture of transfluxor 240 which is affected by both signal 14 and the strobe pulse 250 is placed in a state of greater flux reversal such as for example $\phi_1$.

Upon readout, read-reset source 235 couples to conductor 247 read pulse 254, which is of the opposite magnetic sense as regards transfluxors 240 and 242 as is the clear pulse 248 and is coupled only to the small apertures of transfluxors 240 and 242, reverses in the leg between the large and small apertures that amount of flux reversed by the previously coupled signal 14 and strobe pulse 250 as regards transfluxor 240 and that amount of flux reversed by the previously coupled strobe pulse 250 as regards transfluxor 242. This change of the flux states of the flux about the small apertures of transfluxors 240 and 242 from $\phi_1$ and $\phi_0$, respectively, back to their original flux state $-\phi_S$ produces a net flux change $\phi_1-\phi_0$ affecting output conductor 246 due to the oppositely wound sense of conductor 246 about the small apertures of transfluxors 240 and 242. This difference flux then is the effective-output-signal-producing-flux-change and accordingly produces an output signal in conductor 246 which is substantially independent of the strobe signal 250 characteristic and which is indicative of the amplitude of the sampled portion of signal 14.

After the readout operation read-reset source 235 couples to conductor 247 reset pulse 256, which has the same wave form characteristic as does read pulse 254 but of the opposite polarity, and which is coupled to the small apertures of transfluxors 240 and 242. Reset pulse 256 resets the flux reversed by the readout pulse 254 in the leg between the large and small apertures setting the flux states of transfluxors 240 and 242 back into their informational state prior to the readout operation. Subsequent couplings of readout pulse 254-reset pulse 256 to conductor 247 provide nondestructive readout on conductor 246 of the information stored in detector 236.

As with the above discussed operation of the system of FIG. 16 the signal from sources 230 would be signal 14 while the strobe pulse 250 could be delayed various delay times with respect to the wave front of signal 14. As illustrated in FIG. 1 with the use of fourteen detectors, such as detector 236 and fourteen associated input sources such as input source 230 a first clear-strobe source 234 delaying strobe pulse 250 a time $D=0$ and each other clear-strobe source 234 providing a strobe pulse 250 having a delay of an additional 100 ns., the successive magnetomotive forces of pulses 250*a*, 250*b*, 250*c*, etc., would be gated into detectors 236, etc., at successively increasing delay times with respect to the wave front of signal 14.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

What is claimed is:

1. A portable radiation hardened recording system, comprising:

sensor means for providing a constant current source type transient signal having a varying amplitude for defining a sensed phenomenon;

recorder means for recording sampled portions of said transient signal including;

a plurality of serially aligned delay means for providing a plurality of delay times, a plurality of serially aligned detector means forming a detector string, ones of said delay means coupled to associated ones of said detector means, strobe-generator means coupled to said serially aligned delay means forming a delay-strobe-generator string, said detector string and said delay-strobe-generator string parallel arranged and common coupled to said sensor means;

said strobe-generator means activated by said transient signal and coupling a constant current source type time-limited strobe pulse to said serially aligned delay means;

each of said detector means storing a sampled portion of said transient signal that is concurrent in time with a delayed strobe pulse from an associated delay means and its respective delayed transient signal;

each of said detectors including a magnetizable memory element capable of being operated in an amplitude-limited, a time-limited or a saturated condition and initially placed in a saturated condition;

said strobe pulse individually capable of placing each of said detectors in a first time-limited flux condition;

said transient signal of an amplitude-duration characteristic insufficient to substantially affect said initial saturated condition; and the concurrence in time of said respectively delayed strobe pulse and said transient signal at each detector causing each of said detectors to be placed in a time-limited condition flux level indicative of the amplitude of said transient signal at said sampled portion.

2. A radiation hardened recording system, comprising:

sensor means;

recorder means including a plurality of serial arranged magnetizable detector means;

readout means;

said sensor means providing a transient electrical signal having a varying amplitude that is representative of a detected phenomenon;

said recorder means recording in said serial arranged detector means separate sampled portions of said transient signal as respectively associated time-limited flux levels, said separate sampled portions defining, point by point, the waveform of said transient signal; and said readout means selectively reading out of said detector means the sampled portions of said transient signal.

3. A radiation hardened recording system, comprising:

sensor means;

recorder means including at least two serial arranged magnetizable memory elements capable of being operated in an amplitude-limited, a time-limited or a saturated condition;

readout means;

said sensor means providing a constant current source type transient electrical signal having varying amplitude that is representative of a detected phenomenon;

said recorder means recording said serial arranged detector means separate sampled portions of said transient signal as respectively associated time-limited flux levels, said separate sampled portions defining, point by point, the waveform of said transient signal; and said readout means selectively reading out of said detector means the flux levels representative of said transient signal sampled portions.

4. A portable radiation-hardened recording system, comprising:
sensor means for providing an electrical output signal having a varying amplitude that is representative of a measured phenomenon;
a strobe-generator means activated by said output signal for providing a strobe signal output;
a plurality of delay means serially coupled to said strobe-generator means for delaying said strobe signal providing a plurality of delay time strobe signals;
a plurality of detector means serially coupled to said sensor means and each coupled by a separate one of said delayed strobe signals;
each of said detector means recording a signal level characteristic of said electrical output signal when sampled by its respective delayed strobe signal; and
each of said recorded characteristics consisting of the relative amplitude of said electrical output signal at each of said plurality of delay times.

5. A portable radiation-hardened recording system, comprising:
sensor means for providing a constant current source type electrical output signal having a varying amplitude that is representative of a measured phenomenon;
clipping means for limiting the maximum amplitude of said electrical output signal;
a strobe-generator means activated by said elctrical output signal for providing a constant current source type time-limited strobe signal output;
a plurality of delay means serially coupled to said strobe-generator for delaying said strobe signal output providing corresponding delay time strobe signals;
a plurality of serially coupled magnetizable detector means with separate ones coupled by corresponding separate ones of said delayed strobe signals;
each of said detector means recording a sampled portion of said electrical output signal as a respective time-limited flux level when strobed by said delayed strobe signal; and
each of said recorded sample portions including the relative amplitude of said electrical output signal at each of said plurality of sampled portion delay times.

6. A portable-radiation-hardened recording system, comprising:
sensor means for providing a constant current source type electrical output signal having a varying amplitude that is representative of a measured phenomenon;
a plurality of delay means all serially coupled by said electrical output signal for providing a plurality of different delayed output signals;
a plurality of stroke-generator means activated by respective ones of said delayed output signals for providing a corresponding delayed constant current source type strobe signal output;
a plurality of serially coupled magnetizable detector means all serially coupled by said output signal, one each coupled by a separate one of said delayed strobe signals;
each of said detector means recording a separate sampled portion of said electrical output signal when concurrently affected by said delayed strobe signal and said electrical output signal; and
each of said recorded separate sampled portions including the amplitude of said electrical output signal at the delay of said concurrently affected delayed strobe signal.

7. A portable radiation-hardened recording system, comprising:
sensor means for providing a constant current source type transient signal having a varying amplitude that is representative of a detected phenomenon;
a strobe-generator means coupled to said sensor means and activated by said transient signal for providing a delayed constant current source type time-limited strobe signal output;
a plurality of delay means serially coupled to said strobe generator means for delaying said strobe signal a plurality of delay times for providing a like plurality of delayed strobe signals;
a plurality of serially aligned detector means serially coupled to said stroke-generator means, each detector means coupled to a separate one of said plurality of delayed strobe signals;
each detector means detecting a separate sample of said transient signal amplitude when strobed by said delayed strobe signal; and
each of said separate samples of the amplitude of said transient signal at each of said plurality of delay times being stored in said respective detectors as a respective time-limited flux level.

8. A portable radiation-hardened recording system, comprising:
sensor means for providing a constant current source type transient signal having a varying amplitude that is representative of a detected phenomenon;
a plurality of delay means all coupled in serial to said sensor means for delaying said transient signal a plurality of delay times for providing a plurality of delayed transient signals;
a plurality of strobe-generator means one each coupled to a respective one of said delay means and activated by respective ones of said delayed transient signals for providing a constant current source type time-limited time delayed strobe signal output;
a plurality of detector means serially coupled to said transient signal and each separately coupled to a separate one of said plurality of delayed strobe signals;
each detector means sampling and recording a separate amplitude portion of said transient signal when strobed by its respective delayed strobe signal; and
each of said separately recorded amplitude portions including the relative amplitude of said transient signal at each of said delay times.

9. A portable radiation hardened recording system, comprising:
sensor means;
recorder means;
said sensor means coupling to said recorder means a constant current source type transient electrical signal output having a time-variable amplitude for defining a sensed phenomenon;
said recorder means including;
clipper means coupled to said sensor means for limiting the maximum amplitude of said transient signal to a predetermined level,
a plurality of serial arranged delay means all coupled in serial to said clipper means for delaying said transient signal a plurality of delay times for providing a plurality of corresponding delayed transient signals,
a plurality of serial arranged detector means all coupled in serial to said clipper means,
a plurality of strobe-generator means each coupling associated ones of said delay means and said detector means for providing a constant current source type delayed strobe signal to the associated detector means when activated by its associated delay means;
each of said detector means sampling and recording a separate portion of said transient signal when strobed by its associated delayed strobe signal; and
readout means seelctively reading out the recorded sampled portions of said transient signal from said detector means.

10. A portable radiation hardened recording system, comprising:

sensor means;
recorder means;
said sensor means coupling to said recorder means a constant current source type transient electrical signal output having a varying amplitude for defining a sensed phenomenon;
said recorder means including;
clipper means coupled to said sensor means for limiting the maximum amplitude of said transient signal,
a strobe-generator means coupled to said clipper means for providing a constant current source type time-limited strobe signal output,
a plurality of serial arranged delay means all coupled in serial to said strobe generator means for delaying said strobe signal a like plurality of delay times for providing a like plurality of corresponding delayed strobe signals,
a plurality of serial arranged magnetizable detector means serially coupled to said clipper means,
associated ones of said delayed strobe signals coupled to associated ones of said detector means;
each of said detector means sampling and recording a separate portion of said transient signal when strobed by its associated delayed strobe signal as a time-limited flux level representative of the amplitude of the sampled portion of said transient signal; and
readout means selectively reading out the recorded sampled portions of said transient signal from said detector means.

11. A portable radiation hardened recording system, comprising:
sensor means;
recorder means;
said sensor means coupling to said recorder means a constant-current source type transient electrical signal having a varying amplitude for defining a sensed phenomenon;
said recorder means including;
magnetic clipper means,
strobe-generator means,
a plurality of serially aligned various delay time delay means coupled to said clipper means, and,
a plurality of serially aligned detector means coupled to said clipper means,
each of said detector means including a magnetizable memory element capable of being operated in an amplitude-limited, a time limited or a saturated condition;
a separate one of said detector means separately coupled to a separate one of said delay means forming delay-detector sets;
said strobe-generator means intermediate said clipper means and said serially aligned delay means;
said strobe-generator means activated by said transient signal and coupling a constant current source type time-limited strobe pulse to said serially aligned delay means, each of said serially aligned delay means coupling an associated delayed strobe pulse to its associated detector means;
each of said detector means sampling a separate portion of said transient signal when strobed by its associated delayed strobe pulse; and
each of said sampled portions recorded in each of said separate detectors as a different time delayed time-limited flux level.

12. A portable radiation hardened recording system, comprising:
sensor means;
recorder means;
said sensor means coupling to said recorder means a constant-current source type transient electrical signal having a varying amplitude for defining a sensed phenomenon;
said recorder means including;
magnetic clipper means,
strobe-generator means,
a plurality of serially aligned various delay time delay means coupled to said clipper means, and,
a plurality of serially aligned detector means coupled to said clipper means,
each of said detector means including a magnetizable memory element capable of being operated in an amplitude-limited, a time limited or a saturated condition;
a separate one of said detector means separately coupled to a separate one of said delay means forming delay-detector sets;
said strobe-generator means intermediate said clipper means and said serially aligned delay means;
said delay-detector sets all coupled in parallel to said clipper means;
said clipper means coupling said transient signal from said sensor means to said parallel arranged delay-detector sets and said strobe-generator means and limiting the amplitude of said transient signal to the storage capacity of said detectors;
said strobe-generation means activated by said transient signal and coupling a constant current source type time-limited strobe pulse to said serially aligned detector means providing corresponding variously delayed strobe pulses;
each of said detector means sampling a separate portion of said transient signal when concurrently strobed by its corresponding delayed strobe pulse; and
each of said sampled portions recorded in each of said separate detectors as a time-limited flux level, each level indicative of the amplitude of said transient signal at said sampled portion.

13. A portable radiation hardened recording system, comprising:
sensor means for providing a constant current source type transient signal having a varying amplitude for defining a sensed phenomenon;
recorder means for recording sampled portions of said transient signal including;
a plurality of serially aligned delay means for providing a plurality of delay times,
a plurality of serially aligned detector means each separately coupled to a separate one of said delay means forming a like plurality of delay-detector sets,
a plurality of strobe-generation means each separately coupled intermediate said delay means and said detector means of separate delay-detector sets,
clipper means for limiting the maximum amplitude of said transient signal to the storage capacity of each of said detector means;
said plurality of delay-detector sets parallel arranged and coupled to said clipper means;
said clipper means coupling said transient signal from said sensor means to said parallel arranged delay-detector sets;
said strobe-generator means activated by said transient signal from their associated delay means and coupling a delayed constant current source type time-limited strobe pulse to said associated detector means;
each of said detector means storing a sampled portion of said transient signal that is concurrent in time with said delayed strobe pulse and its respective transient signal;
each of said detectors including a magnetizable memory element capable of being operated in an amplitude-limited, a time-limited or a saturated condition and initially placed in a saturated condition;
said strobe pulse individually capable of placing each of said detectors in a first time-limited flux condition;
said transient signal of an amplitude-duration characteristic insufficient to substantially effect said initial saturated condition; and the concurrence in time of said respectively delayed strobe pulse and said transient signal at each detector causing each of said detectors to be placed in a time-limited condition flux level indicative of the amplitude of said transient signal at said sampled portion.

14. A portable radiation hardened recording system, comprising:

sensor means for providing a constant current source type transient signal having a varying amplitude for defining a sensed phenomenon;

recorder means for recording sampled portions of said transient signal including;

a plurality of serially aligned delay means for providing a plurality of delay times, a plurality of serially aligned detector means, clipper means for limiting the maximum amplitude of said transient signal to the storage capacity of an associated detector means, said clipper means coupling said transient signal from said sensor means to said delay means and said detector means;

strobe-generator means coupled intermediate said serially aligned delay means and said clipper means, said strobe-generator means activated by said transient signal and causing said serially-aligned delay means to couple associated delayed constant current source type time-limited strobe pulses to associated ones of said detector means;

each of said detector means storing a sampled portion of said transient signal that is concurrent in time with said associated delayed strobe pulse and its respective transient signal;

each of said detectors including a magnetizable memory element capable of being operated in an amplitude-limited, a time-limited or a saturated condition and initially placed in a saturated condition;

said strobe pulse individually capable of placing each of said detectors in a first time-limited flux condition;

said transient signal of an amplitude-duration characteristic insufficient to substantially affect said initial saturated condition; and the concurrence in time of said strobe pulse and said respectively delayed transient signal at each detector causing each of said detectors to be placed in a time-limited condition flux level indicative of the amplitude of said transient signal at said sampled portion.

References Cited

UNITED STATES PATENTS

| | | | |
|---|---|---|---|
| 2,817,815 | 12/1957 | Evans | 328—151 |
| 2,881,255 | 4/1959 | Hall | 328—151 |
| 2,896,193 | 7/1959 | Herrmann | 340—174 |
| 2,896,194 | 7/1959 | Crane | 340—174 |
| 3,007,140 | 10/1961 | Minnick | 340—174 |
| 3,063,014 | 11/1962 | Shanks | 328—151 |
| 3,133,254 | 5/1964 | Lindsey | 328—151 |

RODNEY D. BENNETT, *Primary Examiner.*

C. E. WANDS, *Assistant Examiner.*

U.S. Cl. X.R.

250—83.3